W. E. RILEY.
AMUSEMENT DEVICE OR NOVELTY.
APPLICATION FILED JAN. 10, 1910.
1,001,447.
Patented Aug. 22, 1911.
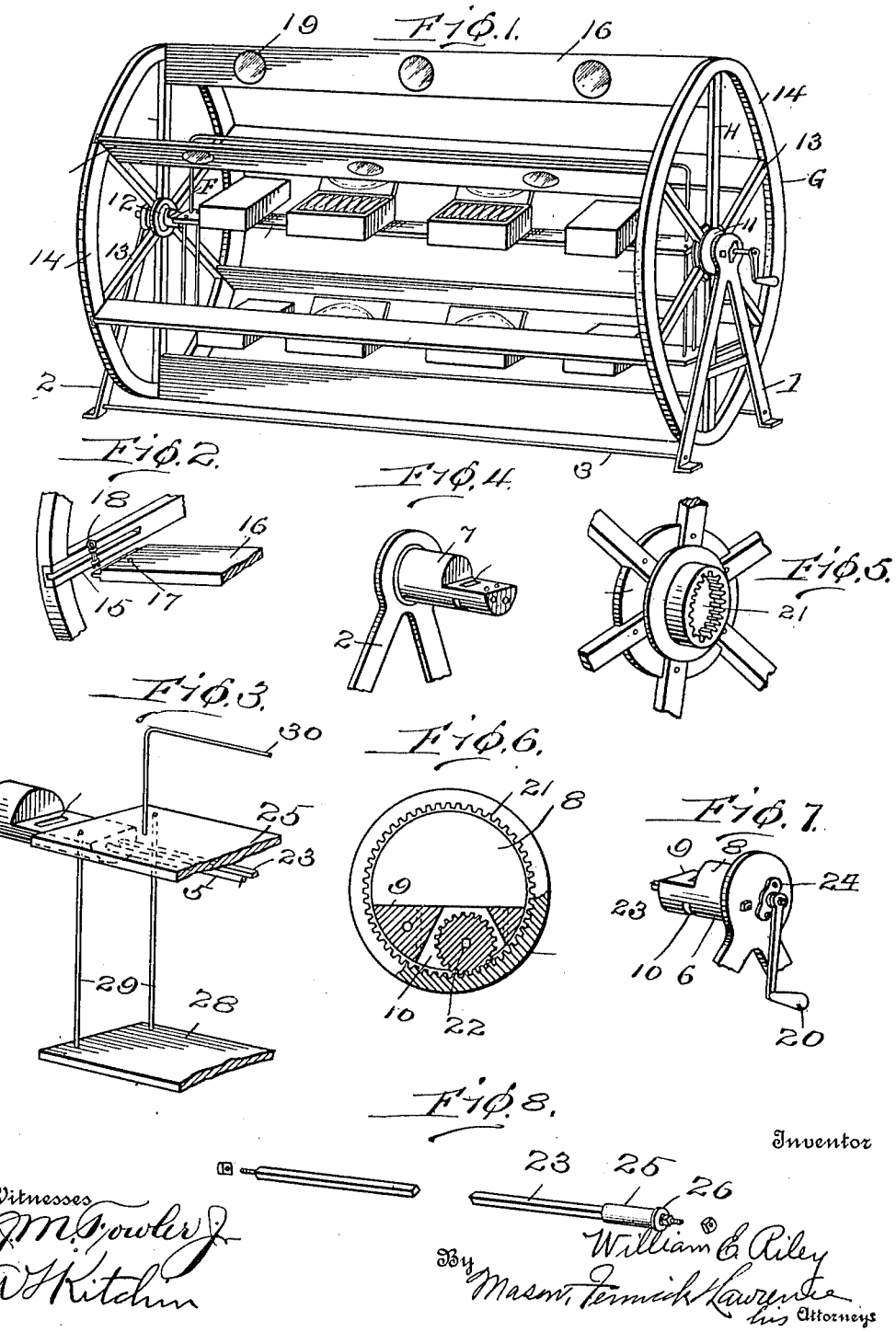

UNITED STATES PATENT OFFICE.

WILLIAM E. RILEY, OF LOUISVILLE, KENTUCKY.

AMUSEMENT DEVICE OR NOVELTY.

1,001,447.

Specification of Letters Patent. Patented Aug. 22, 1911.

Application filed January 10, 1910. Serial No. 537,255.

*To all whom it may concern:*

Be it known that I, WILLIAM E. RILEY, a citizen of the United States, residing at Louisville, in the county of Jefferson and State of Kentucky, have invented a certain new and useful Amusement Device or Novelty; and I do hereby declare the following to be a full, clear, and exact description of the invention, such as will enable others skilled in the art to which it appertains to make and use the same.

This invention relates to improvements in amusement devices, and has for an object the arrangement of means for displaying articles in any desired position.

A further object of the invention is the arrangement of improved means for displaying articles and at the same time revolving a plurality of blades around the articles, the blades being formed with mirrors or other reflecting devices for causing rays of light to be flashed across the vision as the blades or paddles are moved.

A still further object of the invention is the arrangement in a display amusement device of means for rotating a plurality of paddle structures around a stationary structure, the means comprising principally interacting gears and associated parts connected with a crank or other power means for permitting a proper application of power whenever desired.

With these and other objects in view the invention comprises certain novel constructions, combinations, and arrangement of parts as will be hereinafter more fully described and claimed.

In the accompanying drawings: Figure 1 is a perspective view of an embodiment of the invention. Fig. 2 is an enlarged detail fragmentary perspective view of one of the spokes and associated parts, embodying certain features of the invention. Fig. 3 is an enlarged detail fragmentary perspective view of the rests. Fig. 4 is an enlarged detail fragmentary perspective view of one of the journals. Fig. 5 is an enlarged detail fragmentary perspective view of one of the hubs. Fig. 6 is an enlarged front view of the inner acting gear structure and part of the supporting journal. Fig. 7 is an enlarged fragmentary perspective view of the opposite journal to that shown in Fig. 4. Fig. 8 is a detail fragmentary perspective view of a propelling shaft.

In constructing a device embodying the invention it is aimed to arrange a plurality of stationary supports held stationery by end brackets or supports of any kind. Supported by the end brackets is a drum arrangement having a plurality of paddles with mirrors arranged thereon. These paddles and mirrors are designed to be moved around the stationary supports for distracting or confusing the view of the objects arranged on the stationary supports, and to this end the drum or revolving member is connected with means which may be operated for rotating the moving parts at any desired speed.

In order that the invention may be more clearly understood an embodiment of the same is shown in the accompanying drawings in which 1 and 2 indicate standards, and 3, 4 and 5 stay rods for holding the standards properly spaced apart, and also for preventing any spreading thereof. Connected with standards 1 and 2 are journal members 6 and 7 which are of identical construction and therefore the description of one will equally apply to both. Journal 6 is formed with a bearing portion 8, cut out portion 9, and a slot or groove portion 10. Hubs 11 and 12 rest on the journal members 6 and 7 and are supported thereby, together with the spokes and other associated parts connected with the hubs. Connected with each of the hubs are a plurality of spokes 13 and a rim 14. Each of the spokes 13 is provided with a groove 15 (Fig. 2) for receiving the end of one of the paddles 16. The paddles 16 are provided with apertures 17 at each end for accommodating a cotter pin 18 which normally holds the ends of the paddles in the grooves 15 but permits an easy removal thereof. Each of the paddles 16 is provided with one or more mirrors 19.

The hubs, spokes, rims, and paddles constitute a movable drum structure which is arranged to be propelled by any suitable means, preferably by a hand operated crank 20. Each of the hubs is provided with an interiorly geared sleeve 21 which meshes with a gear wheel 22. Gear wheels 22 are arranged in the slots or grooves 10 formed in each of the journal members 6 and 7, but project sufficiently therefrom to properly engage the teeth of the sleeves 21. A shaft 23, preferably square, extends from one end of the drum to the other so that power applied by crank 20 at one end will be transmitted to both of the gear wheels 22 in order to have a positive drive at each end of the drum. Crank 20 is secured to shaft 23 by any desired means, as for instance a nut, and may be applied and removed whenever desired, or by the operation of a pivotally mounted catch 24 the entire shaft 23, as well as crank 20, may be removed. Rigidly connected with shaft 23 is a bearing member 25 and a washer 26. When assembling the device the shaft 23 is forced through a suitable aperture provided in the end of standard 1, through a suitable aperture in bearing member 6, the gear wheel 22 arranged in slot 10 of bearing member 6, and from thence through the gear wheel arranged in bearing member 7, and also either entirely through or partially through bearing member 7 and standard 2. Also if desired a nut may be provided for the end of shaft 23 which projects beyond standard 2, though the same is not absolutely necessary. If the nut just mentioned is omitted shaft 23 may be removed by pivotally moving catch 24 out of engagement with washer 26 and then moving the shaft longitudinally.

The device is designed to be used as an exhibiting construction, either for amusement or for advertising purposes and display. In accomplishing this result merchandise is placed on the shelves or supports 27 and 28, and then the drum structure is rotated so that the blades or paddles 16 and the mirrors 19 will move around the merchandise and will attract the eye and draw the attention of the observer to the goods displayed. The shelves 27 and 28 are supported upon notched portion 9 of the journal members, and may be rigidly held thereto by any desired means. Shelf 28 is supported by shelf 27 through the use of supporting rods 29. Also connected with shelf 27 is a hand rail 30 which may be used as means for supporting goods, or for any other purpose as desired. By the arrangement of one or more stationary supports and a rotating member means are provided which will attract the eye when the movable member is being operated, especially by the action of the mirrors which cause the reflection of beams of light.

I claim—

1. In a device of the character described, a supporting framework, a plurality of article supporting shelves mounted on said framework, and a rotating member mounted so as to have the periphery thereof rotated around said shelves, said rotating member being formed with a plurality of blades for intermittently shutting off the view of the article from said shelves.

2. In a device of the character described, a supporting framework, a plurality of shelves connected therewith, a rotating member formed with end wheel structures, a plurality of blades connected with the periphery of said end wheel structures arranged to intermittently shut off the view from the articles on said shelves, and means for rotating the end members and the blades.

3. In a device of the character described, a supporting framework, an article carrying shelf mounted on said framework, and a rotating member arranged to have part of the periphery thereof moved around said article supporting shelf, said rotating member comprising end wheels formed with grooves at predetermined intervals, a plurality of blades having the ends fitting into said grooves, a pin at each end of each of said blades arranged to connect the respective blades to the end wheels, and means for rotating the end wheels and said blades.

4. In a device of the character described, a supporting framework, a shelf rigidly mounted on said framework formed with journal members, one of which has a notched out portion therein, a rotating member journaled on said journal members and designed to have part thereof moved around said shelf, a gear member rigidly secured to said rotating member formed with internal cogs, a pinion journaled in the notched out portion of one of said journal members and arranged to mesh with the cogs of said gear member, and means for rotating said pinion, whereby power is conveyed to said rotating member.

5. In a device of the character described, a supporting framework, a shelf mounted thereon, a rotating member mounted so as to have the periphery thereof pass around said shelf, and a plurality of mirrors arranged on said rotating member.

WM. E. RILEY.

Witnesses:
 GEO. H. SPECHT,
 E. J. GREEN.

Copies of this patent may be obtained for five cents each, by addressing the "Commissioner of Patents, Washington, D. C."